United States Patent [19]

Ohmamyuda et al.

[11] Patent Number: 5,010,457
[45] Date of Patent: Apr. 23, 1991

[54] APPARATUS FOR ADJUSTING ATTITUDE OF OPTICAL AXES OF HEAD LAMPS ON VEHICLE

[75] Inventors: Yukio Ohmamyuda, Sagamihara; Toru Tanabe, Machida; Osamu Matsumoto, Fuchu; Hidenobu Suzuki, Kawasaki; Masashi Jyouzuka, Yokohama, all of Japan

[73] Assignee: Stanley Electric Co., Ltd., Japan

[21] Appl. No.: 560,106

[22] Filed: Jul. 31, 1990

[30] Foreign Application Priority Data

Jul. 31, 1989 [JP] Japan ................................ 1-89948[U]
Jul. 31, 1989 [JP] Japan ................................ 1-89949[U]

[51] Int. Cl.$^5$ .............................................. B60Q 1/06
[52] U.S. Cl. ................................... 362/66; 362/286; 362/272
[58] Field of Search ................... 362/66, 71, 272, 286, 362/428, 276

[56] References Cited

U.S. PATENT DOCUMENTS 4,162,424 7/1979 Zillgitt et al. .................... 362/71 X
4,611,263 9/1986 Kawai ................................ 362/71

Primary Examiner—Stephen F. Husar
Attorney, Agent, or Firm—Louis Weinstein

[57] ABSTRACT

An apparatus for properly adjusting an attitude of optical axes of head lamps on a vehicle includes a motor driven actuator and a controlling section. The motor driven actuator additionally includes a voltage dividing circuit comprising two resistors and one of a plurality of contact positions in the controlling section is earthed directly, whereby a resistance value of the controlling section becomes zero ohm when the angle of elevation assumed by the head lamps is maximized in an upward tilted state. A motor circuit in the motor driven actuator includes in a power supply line an element for preventing an excessive intensity of electric current from being fed to a motor when motor is held in a blocked state for some reason. Preferably, the element has positive temperature characteristics which suppress generation of heat when rotation of the motor is blocked.

8 Claims, 4 Drawing Sheets

APPARATUS FOR ADJUSTING ATTITUDE OF OPTICAL AXES OF HEAD LAMPS ON VEHICLE

BACKGROUND OF THE INVENTION

1. Field of the Invention

The present invention relates generally to an apparatus for properly adjusting the optical axes of head lamps on a vehicle. More particularly, the present invention relates to an improvement of the apparatus of the foregoing type for correctly adjusting the direction of light beams irradiated from the head lamps in response to variation of an attitude of the vehicle due to variation of a load caused when a driver rides on the vehicle or a cargo is placed on the vehicle.

2. Description of the Prior Art

FIG. 8 is a block diagram which schematically illustrates by way of example a conventional apparatus for properly adjusting the optical axes of head lamps on a vehicle. Referring to FIG. 8, the apparatus is generally represented by reference numeral 31. The apparatus 31 includes a controlling section 32 on the driver's seat side and a motor driven actuator 35 on the head lamp side. Specifically, the controlling section 32 comprises a plurality of resistors 33 and a switch 34 so as to enable one of a plurality of position voltages to be selectively set by the switch 34. On the other hand, the motor driven actuator 35 comprises a voltage comparing circuit 36 into which the position voltage which has been set by the controlling section is inputted, a motor circuit to be described later and a potentiometer 39 for detecting an angle of elevation assumed by head lamps (not shown) in the form of an elevation angle voltage. The motor circuit comprises a driving circuit 37 and a motor 38. In response to an output from the voltage comparing circuit 36, the motor 38 is driven by the driving circuit 37 to correctly adjust the angle of elevation which has been assumed by the head lamps. To this end, the direction of rotation of the motor 38 and a quantity of rotation of the motor 38 are controlled by comparing the position voltage derived from the voltage comparing circuit 36 with the detected elevation angle voltage so that an angle of elevation to be assumed by the head lamps coincides with the angle of elevation which has been set by the controlling section 32.

In addition, FIG. 9 is a block diagram which schematically illustrates by way of example a conventional motor circuit which is an essential component for the apparatus shown in FIG. 8. The conventional motor circuit is generally represented by reference numeral 31. As is apparent from the drawing, the motor circuit 31 comprises a driving circuit 37 and a motor 38. A controlling circuit 20 is arranged upstream of the driving circuit 37. In response to a command signal from the controlling circuit 20 indicative of normal rotation, reverse rotation, high speed rotation or low speed rotation, the driving circuit 37 converts the received command signal into an electric signal for driving the motor 38 in conformity with the given command.

Additionally, to prevent the motor 38 from being excessively heated due to failure of its rotation when the motor 38 is brought in a blocked state for some reason, a protective element 34 for preventing an excessive intensity of electric current from being fed to the motor 38 is arranged between the driving circuit 37 and the motor 38 in a serial relationship relative to a connection line 33a extending therebetween. It is preferable that the element 34 has positive temperature characteristics.

With respect to the conventional apparatus 31 as described above with reference to FIG. 8, optimum electrical characteristics of the voltage comparing circuit 36 are primarily taken into account but no particular consideration is taken to make the apparatus 31 itself optimum. Thus, if a connection line extending between the controlling section 32 and the motor driven actuator 35 is inadvertently earthed (i.e. grounded) due to undesirable contact with a vehicle body, it becomes impossible that an angle of elevation to be correctly assumed by the head lamps matches with the angle of elevation derived from the voltage comparing circuit 36. This leads to malfunctions such that the motor 38 is excessively heated to failure of its rotation and optical axes of the head lamps are oriented in an excessively upward tilted state, resulting in normal traffic being obstructed by dazzling light irradiated from the head lamps.

Further, with respect to the conventional motor circuit included in the conventional apparatus, since the driving circuit 37 is connected directly to a power supply source, an excessive intensity of electric current may be fed to the motor 38 when rotation of the motor 38 is blocked, causing the motor 38 to be often damaged. At this time, the motor circuit 31 needs to be repaired.

SUMMARY OF THE INVENTION

The present invention has been made with the foregoing background in mind.

An object of the present invention is to provide an apparatus for properly adjusting the optical axes of head lamps on a vehicle wherein the head lamps are located at optimum positions at all times, even when a connection line extending between a controlling section and a motor driven actuator is earthed for some reason.

Another object of the present invention is to provide an apparatus for properly adjusting the optical axes of head lamps on a vehicle wherein an excessive intensity of electric current is not fed to a motor via a motor circuit included in the apparatus when rotation of the motor is blocked.

To accomplish the above objects, the present invention provides an apparatus for properly adjusting the optical axes of head lamps on a vehicle wherein the apparatus comprises a motor driven actuator for adjusting an angle of elevation to be assumed by the head lamps and a controlling section for controlling a quantity of actuation of the motor driven actuator by selectively changing a resistance value thereof, the motor driven actuator including a voltage comparing circuit, a motor circuit and a potentiometer, the motor circuit comprising a driving circuit and a motor, and the controlling section including a switch and a plurality of resistors connected to the switch via a plurality of contact positions to selectively come in contact with the switch depending on the present angle of elevation, wherein the improvement comprises a voltage dividing circuit arranged upstream of the voltage comparing circuit in the motor driven actuator, the voltage dividing circuit comprising two resistors of which the junction point is connected to one input terminal of the voltage comparing circuit, one of the two resistors being connected to the switch in the controlling section, and one of the contact positions being directly earthed, whereby the resistance value of the controlling section becomes zero ohms when the angle of elevation assumed by the head lamps is maximized in an upward tilted state.

To assure that the motor is not excessively heated due to failure of its rotation, the motor circuit includes in a power supply line a protective element for preventing an excessive intensity of electric current from being fed to the motor therethrough when the motor is held in a blocked state, wherein the element is arranged upstream of the motor circuit in a serial relationship relative to the power supply line.

It is preferable that the protective element has positive temperature characteristics which desirably suppress generation of heat when rotation of the motor is blocked for some reason.

Other objects, features and advantages of the present invention will become apparent from reading of the following description which has been made with reference to the accompanying drawings.

BRIEF DESCRIPTION OF THE DRAWINGS

The present invention is illustrated in the following drawings in which.

DESCRIPTION OF THE PREFERRED EMBODIMENTS

Now, the present invention will be described in detail hereinafter with reference to the accompanying drawings which illustrates a preferred embodiment thereof.

Figure 1:
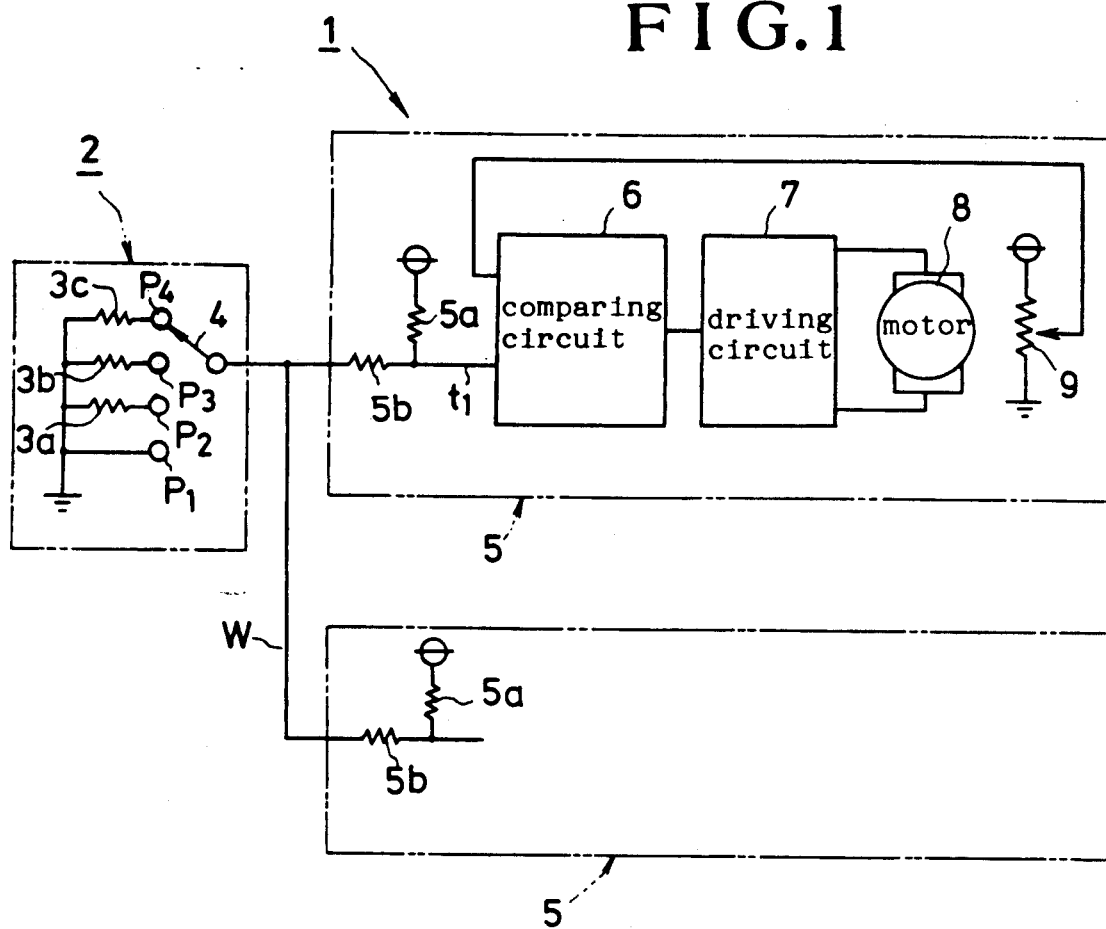
FIG. 1 is a block diagram which schematically illustrates an apparatus for properly adjusting the optical axes of head lamps on a vehicle in accordance with an embodiment of the present invention.
Figure 8:
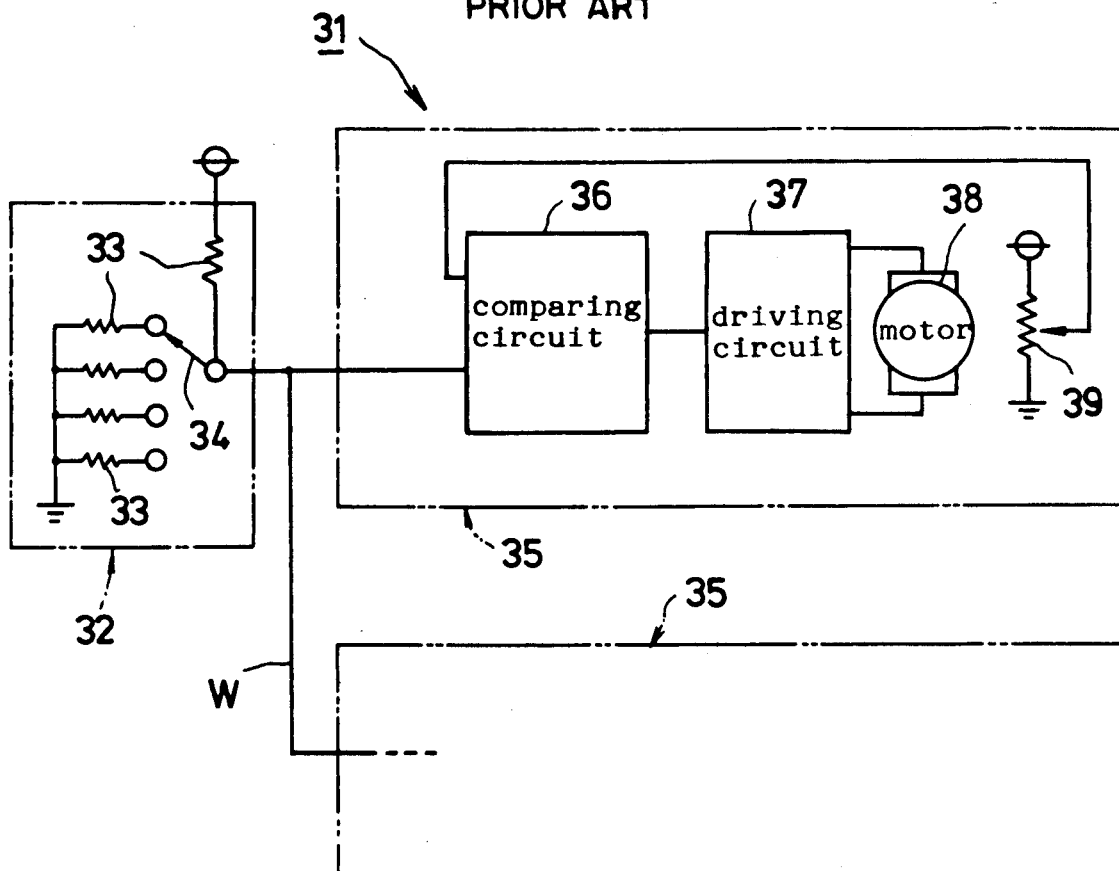
FIG. 8 is a block diagram which schematically illustrates a conventional apparatus of the foregoing type.

In FIG. 1, reference numeral 1 generally designates an apparatus for properly adjusting the optical axes of head lamps on a vehicle. The apparatus 1 includes a motor driven actuator 5 for properly adjusting an angle of elevation to be assumed by the head lamps and a controlling section 2 for controlling a quantity of actuation of the motor driven actuator 5, wherein the motor driven actuator 5 comprises a voltage comparing circuit 6, a motor circuit to be described later and a potentiometer 9 and the controlling section 2 comprises a plurality of resistors, e.g., three resistors 3a to 3c in the illustrated embodiment and a switch 4 for selecting one of the resistors 3a to 3c in the same manner as the conventional apparatus which has been described above with reference to FIG. 8. The motor circuit comprises a driving circuit 7 and a motor 8 and will be described in more detail later. In contrast with the conventional apparatus, according to the present invention, one contact position $p_1$ among four contact positions $p_1$ to $p_4$ to selectively come in contact with the switch 4 in the controlling section 2 is directly earthed irrespective of the resistors 3a to 3c.

As shown in FIG. 1, the actuator 5 additionally includes a voltage dividing circuit comprising a resistor 5a and a resistor 5b of which common junction point is connected to one input terminal $t_1$ of the voltage comparing circuit 6, and the resistor 5b is selectively connected to one of contact positions $p_1$ to $p_4$ in series via the switch 4. Arrangement of the voltage dividing circuit in the above-described manner makes it possible to properly feed the input terminal $t_1$ of the voltage comparing circuit 6 with one of reference voltages $v_1$ to $v_4$, even when the switch 4 is shifted to the contact position $p_1$ and thereby a resistance value of the controlling section 2 becomes zero ohms.

Figure 2:
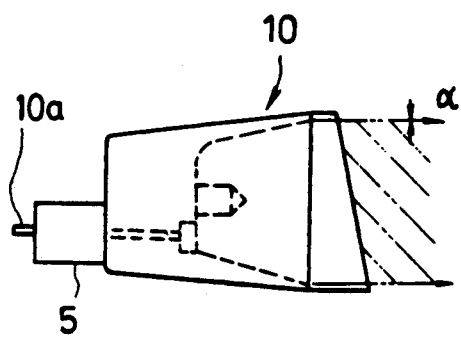
FIG. 2 is a side view of one head lamp, particularly illustrating that the optical axis of the head lamp is oriented in the horizontal direction.
Figure 3:
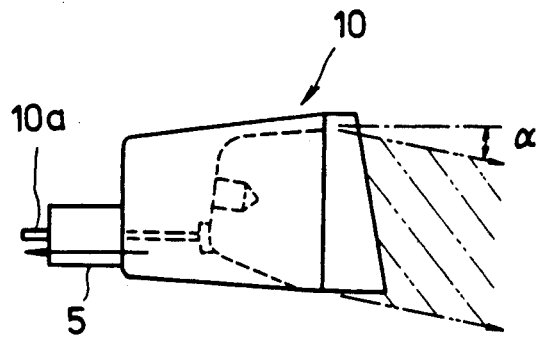
FIG. 3 is a side view similar to FIG. 2, particularly illustrating that the optical axis of the head lamp is oriented in a downward tilted state.

FIGS. 2 and 3 are a side view of one head lamp $1^0$, particularly illustrating by way of example an angle of elevation $\alpha$ to be assumed by the head lamp $1^0$ when the input terminal $t_1$ of the voltage, comparing circuit 6 is fed with one of the reference voltages $v_1$ through $v_4$, respectively.

Specifically, when the voltage comparing circuit 6 is fed with the reference voltage $v_1$, the driving circuit 7 and the potentiometer 9 are activated so as to allow the angle of elevation $\alpha$ relative to the motor 8 to orient in the horizontal direction, i.e., become zero degree, as shown in FIG. 2. Then, the motor 8 stops and the horizontal attitude of the head lamp $1^0$ is continuously maintained.

On the other hand, when the voltage comparing circuit 6 is fed with the reference voltage $v_4$, the driving circuit 7 and the potentiometer 9 are activated such that an adjusting screw 10a is pulled rearwardly relative to the motor 8, whereby the head lamp $1^0$ assumes a downward angle of elevation $\alpha$, e.g., 3° (−3°), as schematically shown in FIG. 3.

Figure 4:
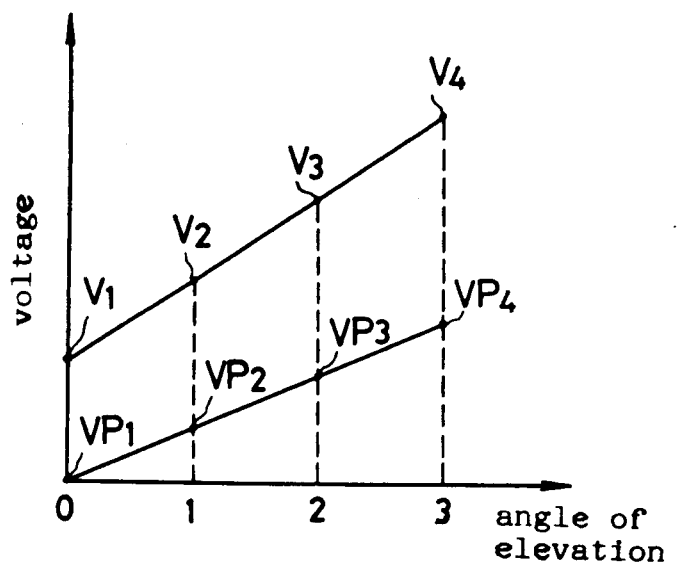
FIG. 4 is a graph which illustrates a relationship between an angle of elevation and a junction voltage via two characteristic lines.

FIG. 4 is a graph which diagrammatically illustrates the foregoing relationship between the angle of elevation to be assumed by the head lamp and the reference voltage. When the voltage comparing circuit 6 is fed with the reference voltage $v_1$, the angle of elevation $\alpha$ assumes zero degree, and when the voltage comparing circuit 6 is fed with the reference voltage $v_4$, the angle of elevation $\alpha$ assumes a value of minus three degrees, as mentioned above with reference to FIGS. 2 and 3. As is apparent from FIG. 4, when the voltage comparing circuit 6 is fed with an intermediate voltage of $v_2$, the angle of elevation $\alpha$ assumes a value of minus one degree, and when the voltage comparing circuit 6 is fed with another intermediate voltage of $v_3$, the angle of elevation $\alpha$ assumes a value of minus two degrees.

Referring to FIG. 4 again, a characteristic line represented by a series of reference characters $vp_1$ to $vp_4$ represents a junction voltage which appears on a bridge line W extending between the controlling section 2 and the motor driven actuator 5, when the voltage comparing circuit 6 is fed with one of the reference voltages $v_1$ to $v_4$. Particularly, it should be noted that when the voltage comparing circuit 6 is fed with the reference voltage $v_1$, the junction voltage $vp_1$ becomes earthed voltage, since the contact position $p_1$ in the controlling section 2 is earthed.

Next, operation of the apparatus 1 constructed in the aforementioned manner will be described below.

When the apparatus properly determines an angle of elevation $\alpha$, one of junction voltages $vp_1$ to $vp_4$ appears on the bridge line W in response to an output from the controlling section 2. When the switch, 4 is shifted to the contact position $p_1$, one of the junction voltages $vp_1$ to $vp_4$, i.e., $vp_1$ is reduced to an earthed level. Thus, even when some earthing trouble takes place with the bridge line W, a voltage for allowing the angle of elevation $\alpha$ to assume zero degree remains within the joint voltages $vp_1$ to $vp_4$ at all times. Therefore, the apparatus of the present invention assures that malfunctions, e.g., incorrect operation of the apparatus for allowing the motor 8 not to stop and undesirable excessive upward tilting of the head lamps 10 are avoided reliably.

It should be added that the state represented by an equation of $\alpha=0°$ designates a state wherein a vehicle is not loaded with any cargo and a vehicle manufacturer usually ships his product of vehicle while the head lamps $1^0$ are adjusted to assume an attitude corresponding to the zero angle of elevation $\alpha$.

Next, description will be made below in more details with reference to FIGS. 5 to 7 with respect to a motor circuit which is an essential component for the apparatus of the present invention. Those components in FIG. 5 which are the same as those in FIG. 1 are represented by the same reference numerals.

Figure 5:
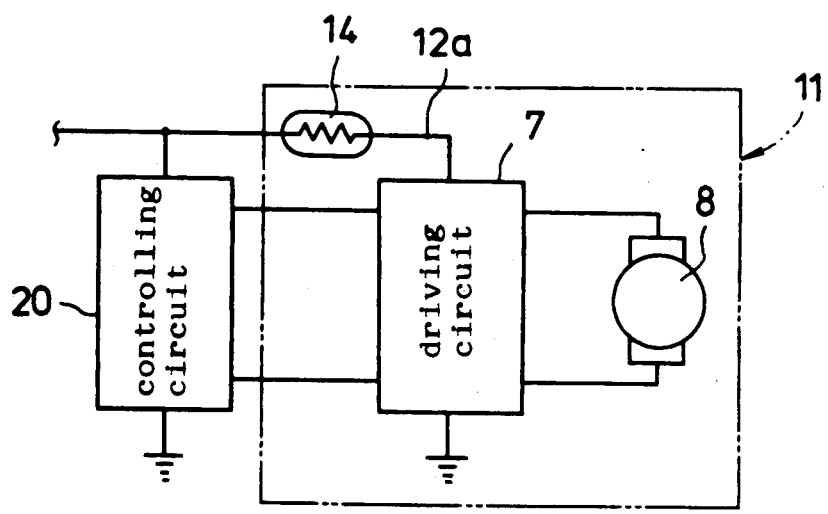
FIG. 5 is a block diagram which schematically illustrates a motor circuit included in a motor driven actuator of the apparatus.
Figure 9:
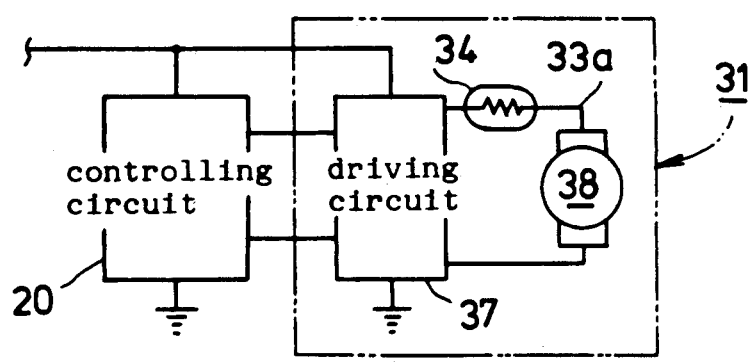
FIG. 9 is a block diagram which schematically illustrates a conventional motor circuit employable for the conventional apparatus in FIG. 8.

In FIG. 5, reference numeral 11 generally designates a motor circuit. The motor circuit 11 comprises a driving circuit 7 and a motor 8, as mentioned above with reference to FIG. 9. A controlling circuit 20 is arranged upstream of the driving circuit 7 in the same manner as the conventional motor circuit which has been described above with reference to FIG. 9. According to the present invention, to correctly drive the motor 8 via the driving circuit 7, the motor circuit 11 includes in a power supply line 12a an element 14 for preventing an excessive intensity of electric current from being fed to the motor 8 therethrough wherein the element 14 has specific positive temperature characteristics and is connected to the driving circuit 7 in series. Arrangement of the element 14 in that way assures that the motor circuit 11 is fed with a proper intensity of electric current through the element 14 at all times.

Figure 6:
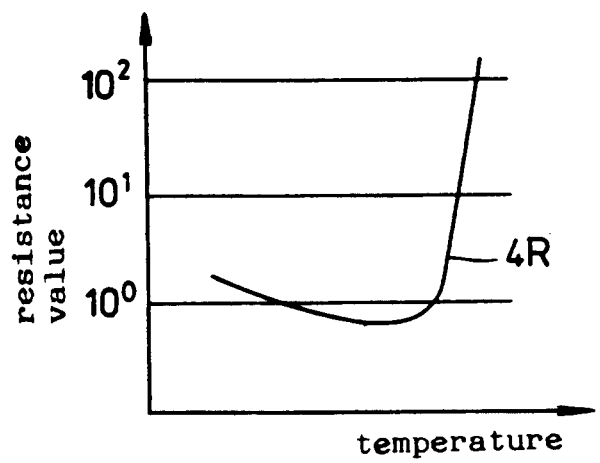
FIG. 6 is a graph which illustrates characteristics of an element for preventing an excessive intensity of electric current to be fed to a motor for the apparatus.

FIG. 6 is a graph which diagrammatically illustrates a typical temperature-resistance characteristic curve 4R of the element 14. Since the element 14 is arranged in a serial relationship relative to the motor circuit 11, when the motor 8 is brought in a blocked state for some reason, the element 14 generates heat by itself as an intensity of electric current flowing through the motor circuit 11 increases due to the blocked state of the motor 8. In response to generation of heat from the element 14 in this way, a resistance value of the element 14 increases owing to its own temperature-resistance characteristics, whereby excessive increasing of the intensity of electric current is suppressed reliably.

Figure 7:
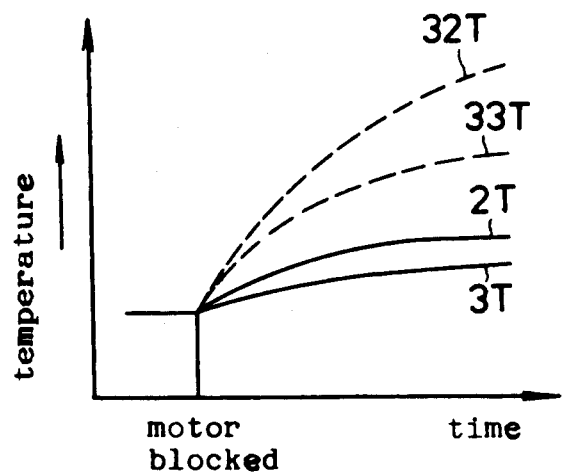
FIG. 7 is a graph which illustrates a relationship between time and temperature via four characteristic lines in comparison with a conventional motor circuit.

In addition, FIG. 7 is a graph which diagrammatically illustrates operation of the motor circuit of the present invention. Referring to FIG. 7, the curve represented by reference characters 2T designates a circuit temperature curve which illustrates temperature increase of the driving circuit 7 after the motor 8 is brought in a blocked state and the curve represented by reference characters 3T designates a motor temperature curve which illustrates temperature increase of the motor 8 after rotation of the motor 8 has been blocked.

To facilitate an understanding of advantageous effects derived from the motor circuit of the present invention by comparing the latter with the conventional motor circuit, a circuit temperature curve 32T and a motor temperature curve 33T, both of which are derived from measurements under the same conditions as those for the curves 2T and 3T, are additionally shown in FIG. 7 together with the curves 2T and 3T.

As is readily apparent from FIG. 7, since the element 14 is arranged in a serial relationship relative to the motor 8 according to the present invention, when the motor 8 is brought in a blocked state for some reason, an intensity of electric current to be fed to the motor 8 via the driving circuit 7 is limited by the element 14 and thereby temperature increasing of the motor 8 is effectively suppressed much more than the conventional motor circuit.

In addition, since the motor 8 is fed with a limited intensity of electric current via the driving circuit 7, a quantity of heat generated by the motor 8 is reduced much more than the conventional motor circuit.

While the present invention has been described above with respect to a single preferred embodiment thereof, it should of course be understood that the present invention should not be limited only to this embodiment but various changes or modifications may be made without departure from the scope of the invention as defined by the appended claims.

What is claimed is:

1. In an apparatus for properly adjusting a head lamp on a vehicle wherein said apparatus comprises a motor driven actuator for adjusting an angle of elevation to be assumed by said head lamp and a controlling section for controlling actuation of said motor driven actuator by selectively changing a resistance value thereof, said motor driven actuator including a voltage comparing circuit, a motor circuit responsive to said comparing circuit and a potentiometer for generating a signal representative of the output position of the motor, said comparing circuit generating a signal responsive to the outputs of said potentiometer and said controlling section, said motor circuit comprising a driving circuit and a motor, and said controlling section including a switch and a plurality of resistors selectively connected to said switch via a plurality of contact positions to selectively come in contact with said switch depending on the present angle of a elevation, the improvement comprising:

a voltage dividing circuit arranged upstream of said voltage comparing circuit in the motor driven actutor, said voltage dividing circuit comprising two series connected resistors of which the common junction point between said two resistors is connected to one input terminal of said comparing circuit, one of said two resistors being connected to said switch in the controlling section; and one of said contact positions being directly earthed, whereby said resistance value of the controlling section becomes zero ohms when the angle of elevation assumed by the head lamps is maximized in an upward tilted state being controlled by said voltage dividing circuit.

2. The apparatus as claimed in claim 1, wherein said motor circuit includes in a power supply line an element for preventing an excessive intensity of electric current from being fed to the motor therethrough when the motor is held in a blocked state, said element being arranged upstream of the motor circuit in a serial relationship relative to said power supply line.

3. The apparatus as claimed in claim 2, wherein said element has a positive temperature characteristic which desirably suppresses generation of heat when the motor is held in a blocked state.

4. Apparatus for adjusting a head lamp on a vehicle comprising:

a motor driven actuator for adjusting the angle of elevation of the head lamp and a controlling section for controlling the actuation of said motor driven actuator by selectively changing a resistance value thereof, said motor driven actuator including a voltage comparing circuit, a motor circuit operated by said voltage comparing circuit and a potentiometer for generating a voltage responsive to the position of said head lamp;

said comparing circuit comparing the voltage generated by said potentiometer with the voltage provided by said controlling circuit;

said motor circuit comprising a driving circuit and a motor;

said controlling circuit including a plurality of resistors and switch means for selectively coupling one of said resistors to said comparing circuit responsive to the desired angle of elevation of said head lamp;

a voltage dividing circuit coupled between said comparing circuit and said controlling means, said voltage dividing circuit including first and second series connected resistors, the common junction therebetween being connected to one input of said comparing circuit, one of said resistors being coupled between said common junction and said switch means;

one of said contact positions of said switch means being directly grounded, the resistance value of the resistor of the dividing circuit coupled between the common junction and said controlling circuit being selected so that the angle of elevation assumed by head lamp is maximized in an upwardly tilted orientation when said switch means is electrically connected with said directly grounded position.

5. The apparatus of claim 4 wherein a plurality of resistors selectively coupled to said switch means have different resistance values.

6. The apparatus of claim 4 wherein the remaining resistor of said first and second series connected resistors is coupled between a power supply voltage and said one input of said comparing circuit.

7. The apparatus of claim 4 further comprising:
means for swingably mounting said head lamp;
an adjusting screw means coupled between said motor means and said head lamp;
said motor means rotating said screw means by an amount and a direction responsive to the resistor coupled to said switch means.

8. The apparatus of claim 4 further comprising a power source for said motor being coupled to said motor through said driving circuit, a protection element coupled between said power source and said driving circuit for protecting the motor end driving circuit from overheating.

* * * * *